Jan. 21, 1936.    R. BURNS    2,028,190
IMPACT TESTING DEVICE AND METHOD
Filed March 31, 1932    2 Sheets-Sheet 1

INVENTOR
R. BURNS
BY
H. G. Banfield
ATTORNEY

Jan. 21, 1936.                R. BURNS                 2,028,190
                    IMPACT TESTING DEVICE AND METHOD
                    Filed March 31, 1932    2 Sheets-Sheet 2
FIG. 3
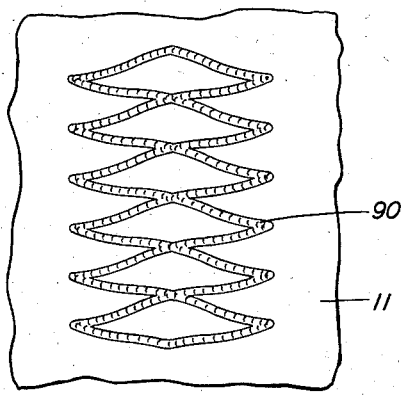
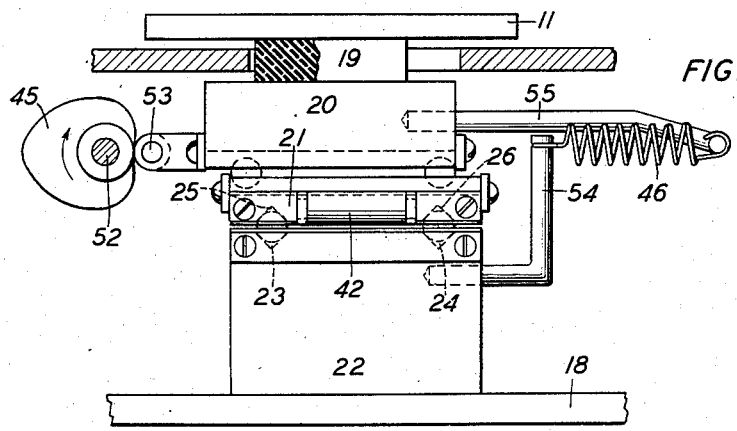
FIG. 4
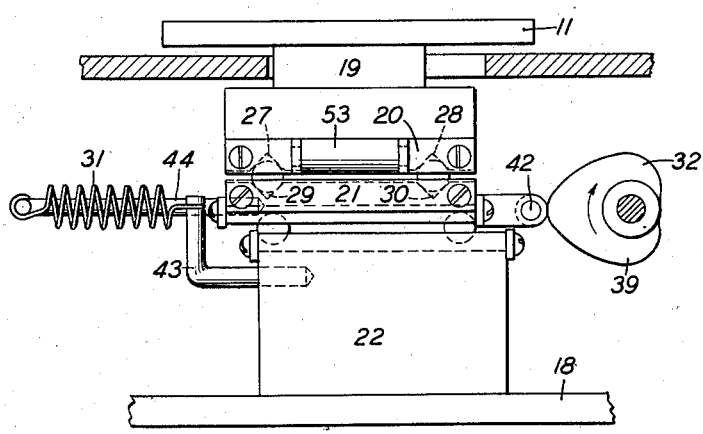
FIG. 5
INVENTOR
R. BURNS
BY
H.G.Bandfield
ATTORNEY Patented Jan. 21, 1936

2,028,190

UNITED STATES PATENT OFFICE 2,028,190

IMPACT TESTING DEVICE AND METHOD

Robert Burns, Brooklyn, N. Y., assignor to Bell Telephone Laboratories, Incorporated, New York, N. Y., a corporation of New York Application March 31, 1932, Serial No. 602,151

5 Claims. (Cl. 73—51)

This invention relates to testing devices and more particularly to an impact testing device for testing the characteristics of surface finishes.

Heretofore, in accordance with the general practice for testing the brittleness and adherence characteristics of surface finishes, the finish under test is subjected to repeated batterings by a suitable impact device which serve to crack the finish in case it is too brittle or to loosen it in case of poor adherence. While in general this method is satisfactory, yet in certain instances, for example, when it is desired to compare characteristics of a given surface finish with those of a standard surface finish this method is unsatisfactory since in such case, it is practically impossible to duplicate the conditions surrounding the previous test such as the force and number of blows and the way in which the specimen was manipulated under the impact device.

An object, therefore, of the present invention is to provide a device for testing the brittleness and adherence characteristics of a surface finish.

A further object is to provide a device wherein characteristics of unknown surface finishes which are tested from time to time may be compared with those of a standard finish previously tested.

In accordance with the present invention these and other objects are obtained by standardizing the conditions surrounding the striking blow, such as the force and the speed of the blow, and automatically manipulating the specimen under the impact device so that each and every specimen is subjected to the same treatment.

Figure 1:
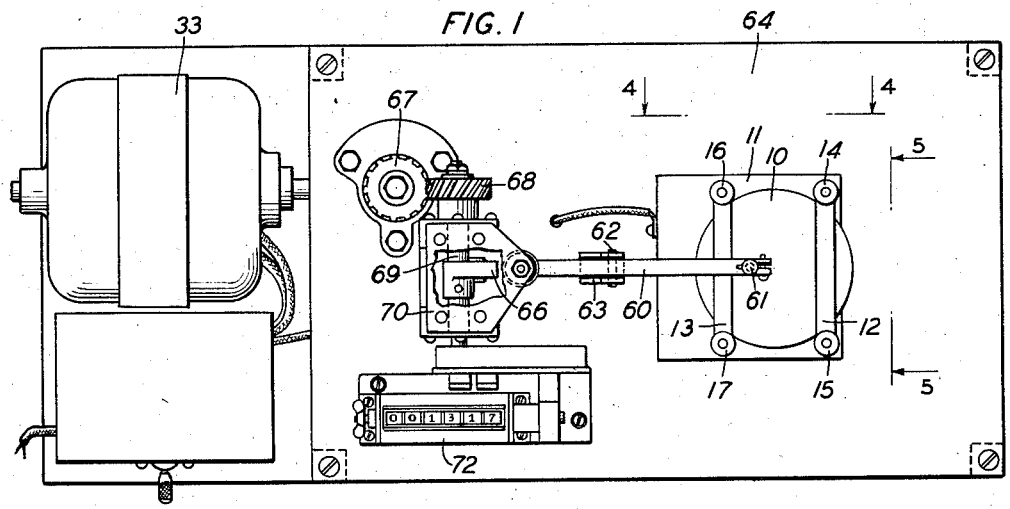
Figure 2:
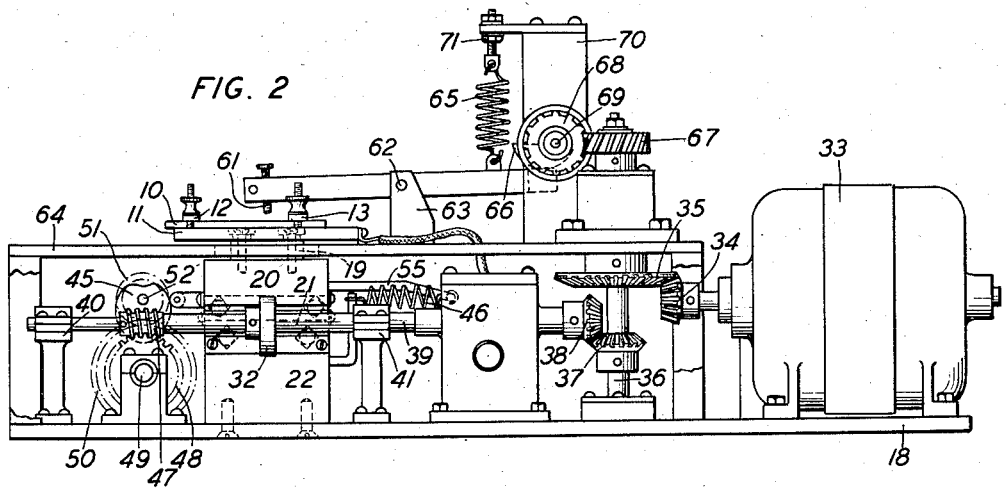

For a clearer understanding of this invention, reference may be had to the accompanying drawings in which:

Fig. 1 is a plan view of a testing device embodying the features of this invention;

Fig. 2 a rear elevation with parts of the casing broken away to more clearly show the mechanism;

Fig. 3 a view showing the type of pattern which is traced by the striking hammer during the travel of the sample holder;

Fig. 4 a detailed view taken along line 4—4 of Fig. 1;

Fig. 5 a detailed view taken along line 5—5; and

Figure 6:
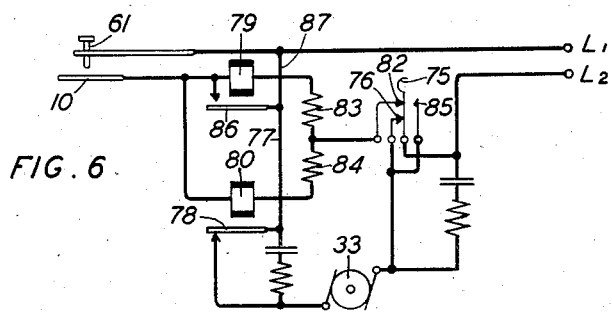

Fig. 6 a schematic view of the electric circuit employed for automatically stopping the machine.

Referring to the drawings, 10 represents a test piece on which is applied a coating of the surface finish to be tested. This test piece which is preferably made from the same sort of material as that on which the surface finish is to be used, is secured to a sample holder 11 by means of clamping arm members 12 and 13, these arm members, in turn, being secured to the sample holder 11 by means of screws 14, 15, 16, and 17. As shown more clearly by Figs. 4 and 5, this sample holder is supported from base 18 by means of blocks 19, 20, 21, and 22, block 22 being securely attached to base 18, while block 21 rests on block 22 and is adapted to be moved in one direction with respect thereto. Blocks 19 and 20 which form an integral member rest on block 21 and are adapted to be moved with respect thereto in a direction which is at right angles to the direction in which block 21 is adapted to be moved with respect to block 22. In certain instances which will be described later, it is desirable to insulate sample holder 11 from the remaining supporting blocks which are preferably made of metal. This is conveniently done by making block 19 of a suitable insulating material, such as bakelite. As shown more clearly in Fig. 4 block 22 is fitted with a pair of grooves 23 and 24 which coincide with a similar pair of grooves 25 and 26 in the bottom of block 21. In the opening thus formed between these blocks, ball bearings are placed which readily permit block 21 being moved in the direction of the grooves with respect to block 22 but prevent lateral displacement therebetween. As shown by Fig. 5 a similar pair of grooves 27 and 28 in block 20 coincide with a pair of grooves 29 and 30 in the top of block 21, grooves 29 and 30 at the top of block 21 being at right angles with the grooves 25 and 26 at the bottom. In the opening thus formed between these two blocks there are also placed ball bearings which readily permit the movement of block 20 in the direction of the grooves with respect to block 21 but prevent lateral movement therebetween. Also as shown more clearly in Fig. 5 longitudinal movement between blocks 21 and 22 in the direction of the grooves is produced by the rotation of cam 32 and the retraction of spring 31. Cam 32 is rotated by power supplied from motor 33 through bevel gears 34 and 35, shaft 36, bevel gears 37 and 38 and shaft 39, shaft 39 being journaled in bearings 40 and 41. As cam 32 rotates in the direction of the arrow, it engages roller 42 secured to block 21 and moves block 21 in the direction of the grooves and thus expands spring 31, one end of which is secured to stationary block 22 by an extending arm member 43 and the other end of which is secured to rod 44 which is firmly secured to block 21. After block 21 has been pushed to its maximum position and the cam 32 continues to rotate, the block is restored to its normal position under the influence of spring 31, the rate of return being controlled by the shape of the cam.

As shown by Fig. 4 longitudinal movement between blocks 20 and 21 in the direction of the grooves is produced by the rotation of cam 45 and the retraction of spring 46. Cam 45 is rotated by power supplied from motor 33 through bevel gears 34 and 35, shaft 36, bevel gears 37 and 38, shaft 39, worm and ring gears 47 and 48, shaft 49, gears 50 and 51 and shaft 52, shafts 52 and 39 being at right angles to one another. As cam 45 rotates, it engages roller 53 secured to block 20 and moves this block in the direction of the grooves and thus expands spring 46, one end of which is secured to stationary block 22 by an extending arm member 54 and the other end of which is secured to block 20 by arm member 55. After block 20 has been moved to its extreme position and cam 45 continues to rotate, block 20 is restored to its normal position with respect to block 21 under the influence of spring 46. Since shaft 52 to which cam 45 is attached is at right angles to shaft 39 to which cam 32 is attached and since the grooves in the top and bottom of block 21 are at right angles to one another, the sample holder 11 is simultaneously moved in two directions. Also, due to the shape of the cams the sample holder travels in the path of a sine wave in each direction and since these directions are at right angles to each other, the sample holder travels a path 90 such as shown by Fig. 3 which resembles the figure generally used for showing a double sine wave wherein one is 180° ahead of the other. The number of complete cycles in the pattern can be varied by changing the ratio of the speed of rotation of the two cams, the ratio for the pattern shown being 12 to 1.

Referring to Figs. 1 and 2, a lever arm 60 carrying a suitable striking hammer 61 at one end is suspended at its center on shaft 62 journaled in bearing 63 which is secured to cover 64 which cover combined with the base and the sides serve to protect the gear trains, etc. from dust. This lever arm is adapted to vibrate at a constant rate under the influence of cam 66 and spring 65. Cam 66 is rotated by power supplied from motor 33 through bevel gears 34 and 35, shaft 36, right angle gears 67 and 68 and shaft 69 which shaft is journaled in stanchion 70. As this cam rotates it raises the end of the lever arm carrying the striking hammer and lowers the other end by exerting pressure thereon. Lowering this end of the lever arm expands spring 65, one end of which is secured to the lever arm and the other end of which is secured to stanchion 70 by means of an adjustable screw and nut arrangement 71. As the cam continues to rotate it releases the pressure upon the lever arm at which time the spring retracts. The spring in retracting causes the striking hammer 61 to come into contact with the material to be tested on the sample holder 10, the force of the blow being controlled by the tension of spring 65. A revolution counter 72 is also connected through a suitable train of reducing gears to shaft 68 and serves to indicate the number of times that the lever arm is acted upon.

In operation, a test piece 10 with which is associated a layer of the material to be tested is clamped on the sample holder 11 and the motor started. When the motor is running the lever arm 60 is vibrated, thus moving the striking hammer into contact with the material under test, the force of the blow being controlled by the tension in spring 65 and the number of blows per minute being controlled by the speed of the motor and the shape of cam 66. Simultaneously with the vibration of the lever arm the sample holding member and hence the test piece 10 which is coated with the material under test, is moved beneath the striking hammer in accordance with the method described above. The vibration of the arm is continued until the surface finish fails or ruptures either by cracking or chipping off. By noting the number of vibrations or impacts required to thus destroy the finish and comparing with the number of vibrations or impacts required to destroy a standard finish an indication is given of the wearing characteristics of the finish under test.

In certain instances it may be preferable to provide means for automatically stopping the vibration of the lever arm the instant a surface finish under test fails, while in other instances it may be desirable to continue the operation further. In order to automatically stop the test upon failure of the finish, there is provided an electric circuit as shown in Fig. 6. In this circuit one terminal consists of the striking hammer 61 and another terminal consists of the metallic disc 10 in electrical contact with sample holder 11 which is insulated from the rest of the machine by means of block 19. When key lever 75 is thrown into engagement with contacts 76 and 82 power is supplied to the motor 33 from $L_1$, conductor 77, armature 78 of relay 80 through the brushes and windings of motor 33, contact 76, key lever 75 back to $L_2$. Under these conditions the motor will continue to rotate until the battery pin 61 breaks through the surface condition and makes contact with metallic disc 10, at which time a second circuit is completed from $L_1$ through hammer 61, disc 10, the windings of relays 79 and 80, resistances 83 and 84, contact 82, key lever 75 and back to $L_2$. Relay 80, in operating, attracts armature 78 thereby breaking the circuit through motor 33 and stopping it. Relay 79 in operating attracts armature 86 thereby providing a path from $L_1$ through conductor 87, to armature 86, where the current divides, one portion flowing through the winding of relay 79 and resistance 83 and another portion through the winding of relay 80, and resistance 84. The two paths are then united and the current passes through contact 82, key lever 75, back to $L_2$. This latter circuit provides a locking arrangement which holds relay 80 in its operated position hence, once contact between members 10 and 61 is established, motor 33 is stopped regardless of the fact that contact between 10 and 61 is later broken. If it is desired to let the motor run regardless of whether contact is made between 10 and 61, key 75 is thrown to the right into engagement with contact 85. This completes a circuit from $L_1$ through conductor 87, armature 78, windings of motor 33, contact 85, key lever 75, back to $L_2$, which circuit remains closed even if pin 61 breaks through the surface finish and makes contact with metallic disc 10.

What is claimed is:

1. A device for testing characteristics of a surface finish comprising means for supporting a sample upon which a coating of the material to be tested has been applied, means for subjecting said finish to a predetermined number of blows during a given interval and means for simultaneously varying in two directions at right angles to each other the position of said sample holder with respect to said impact means.

2. A device for testing characteristics of a surface finish comprising means for supporting a sample upon which a coating of the material to be tested has been applied, means for subjecting said finish to a predetermined number of impacts during a given interval, means for regulating the force of said impacts and means for simultaneously varying in two directions at right angles to each other the position of said sample holder with respect to said impact means.

3. A device for testing characteristics of a surface finish comprising means for supporting a sample with which is associated the material to be tested, means for subjecting said finish to a predetermined number of impacts during a given interval, means for causing the sample holder to travel in the path of a sine wave with respect to said impact means and electrical means for automatically indicating the failure of said finish.

4. The method of testing surface finishes which consists in coating a sample holder with the material to be tested, subjecting said finish to a predetermined number of uniform impacts during a given interval while continuously moving said sample holder in a repeated path with respect to said impact means in such manner that successive impacts progressively trace a sine wave pattern on said test surface.

5. A device for testing characteristics of a surface finish comprising means for supporting the sample upon which a coating of the material to be tested has been applied, means for subjecting said finish to a predetermined number of uniform blows during a given interval, and means for simultaneously varying the position of the sample holder with respect to the impact means, said varying means comprising a cam arranged to vary the position of the sample holder in one direction and a second cam for varying the position of the sample holder in a direction at right angles to the direction of movement caused by said first cam.

ROBERT BURNS.